(12) United States Patent
Foley et al.

(10) Patent No.: US 6,570,754 B2
(45) Date of Patent: May 27, 2003

(54) RENOVATION LOAD CENTER AND METHOD OF REPLACING EXISTING LOAD CENTER

(75) Inventors: Brendan Arthur Foley, Allison Park, PA (US); Jeffrey Alan Doneghue, Sherman, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/865,192

(22) Filed: May 24, 2001

(65) Prior Publication Data

US 2002/0176222 A1 Nov. 28, 2002

(51) Int. Cl.[7] ................................. H02B 1/04
(52) U.S. Cl. ................. 361/648; 29/884; 174/72 B; 361/652
(58) Field of Search .............. 361/622, 624, 361/627, 648, 634–637, 641, 644, 652–656, 823, 824, 826, 827; 174/70 B, 71 B, 72 B, 88 B, 149 B; 439/212, 709, 716–718; 29/622, 623, 884

(56) References Cited

U.S. PATENT DOCUMENTS

| | | | | |
|---|---|---|---|---|
| 3,983,311 A | * | 9/1976 | Brumfield et al. | 174/50 |
| 4,667,269 A | * | 5/1987 | Morby et al. | 361/638 |
| 4,689,493 A | * | 8/1987 | Nozick et al. | 307/147 |
| 4,783,718 A | | 11/1988 | Raabe et al. | |
| 5,053,919 A | | 10/1991 | Schacht | |
| 5,340,945 A | | 8/1994 | Gehrs et al. | |
| 5,745,337 A | | 4/1998 | Reiner | |
| 5,870,276 A | * | 2/1999 | Leach et al. | 361/627 |
| 5,905,630 A | * | 5/1999 | Wetterling | 361/625 |
| 6,262,880 B1 | * | 7/2001 | Fischer et al. | 361/652 |
| 6,365,990 B2 | * | 4/2002 | Flegel | 307/64 |

* cited by examiner

*Primary Examiner*—Gerald Tolin
(74) *Attorney, Agent, or Firm*—Martin J. Moran

(57) ABSTRACT

A load center is upgraded by removing the existing load center and replacing it with a renovation load center. As the existing incoming and branch circuit wiring may not be sufficiently long enough to reach the proper terminations in the replacement load center, renovation terminal blocks are provided in the renovation load center adjacent the penetrations of the external wiring to which the incoming lines, and if necessary, the branch circuit wiring are connected. Cabling is then provided between the terminations on the renovation terminal blocks and the appropriate load center terminations. The renovation terminal block(s) can be housed in an auxiliary enclosure mounted adjacent to a main enclosure containing the load center interior or all of the components can be housed in a single renovation enclosure.

10 Claims, 3 Drawing Sheets

RENOVATION LOAD CENTER AND METHOD OF REPLACING EXISTING LOAD CENTER

BACKGROUND OF THE INVENTION

1. Field of the Invention

This invention relates to replacing an existing load center with a renovation load center without the need for rewiring the distribution system.

2. Background Information

Load centers house the connections between the incoming lines of an electric power distribution system and the numerous branch circuits in an installation, such as a residence or light commercial or industrial facility. Overcurrent protection is provided for the branch circuits in older load centers by fuses but now in most installations by circuit breakers. Additional protection, such as surge protection, is provided in some load centers. Typically, the load center will have a main circuit breaker as well as separate breakers for each of the branch circuits.

The load center includes an enclosure that may be fabricated from sheet metal or molded of an insulative resin. Housed in the enclosure is a branch circuit assembly, also commonly referred to as the interior, which typically includes a pair of line buses secured by a support insulator to the rear wall of the enclosure. The fuses or circuit breakers connect each branch hot conductor to one of the line buses, or to both buses in the case of a two pole breaker. The branch circuit assembly also includes one or more neutral terminal blocks to which the branch circuit neutral conductors are secured. In some cases, such as for ground fault circuit breakers, a ground terminal block or blocks are also provided in the enclosure.

There comes a time when the existing load center needs to be replaced, such as where a fuse load center is replaced by a load center with circuit breakers, or for instance, where branch circuits are added or updated. Typically, in existing load centers, the incoming lines are made as short as possible. It is common for them to be too short to reach the required terminals in the replacement load center. However, the gauge of the incoming lines is large enough that it is difficult, time consuming and expensive to splice extensions onto the incoming lines.

There is a need, therefore, for an improved load center and method of upgrading a load center which does not require the splicing of the incoming lines.

SUMMARY OF THE INVENTION

These needs and others are satisfied by the invention which is directed to a renovation load center for a distribution system having incoming lines and a plurality of branch conductors, each including a hot conductor and a neutral conductor. The renovation load center includes an enclosure having a rear wall and a branch circuit assembly mounted in the enclosure on the rear wall with line terminals at the one end of the assembly. An incoming terminal block is provided adjacent the one end of the branch circuit assembly and has line terminations for the incoming lines. Cables engaging the line terminations connect the incoming lines to separate ones of the line terminals on the branch circuit assembly. The incoming terminal block can be mounted on the rear wall of the enclosure adjacent the line terminals on the branch circuit assembly. The branch circuit assembly can include a circuit breaker mounting assembly with the line terminals at the one end and at least one neutral/ground terminal block. An additional neutral/ground terminal block can be provided adjacent the incoming terminal block.

The enclosure of the load center may include a main enclosure in which the branch circuit assembly is mounted and an auxiliary enclosure in which the incoming terminal block is mounted. In this case, the cables extend from the incoming terminal block in the auxiliary enclosure to the branch circuit assembly in the main enclosure.

The invention also embraces the method of upgrading an existing load center by disconnecting the input lines and branch circuit conductors from the existing load center, removing the existing load center, mounting a renovation load center in place of the existing load center, providing a renovation terminal block in an enclosure of the renovation load center, connecting the incoming lines to terminations on the renovation terminal block, connecting cables from the terminals on the renovation terminal block to line terminals on the branch circuit assembly of the renovation load center, and connecting the branch circuit hot conductors and neutral conductors in the renovation load center. The renovation load center may have a single main enclosure, in which the renovation terminal block is mounted, or alternatively the renovation panel may have a main enclosure housing the branch circuit assembly and an auxiliary enclosure housing the renovation terminal block mounted adjacent to the main enclosure. In the latter case, connecting the cables includes routing the cables from the auxiliary enclosure to the main enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
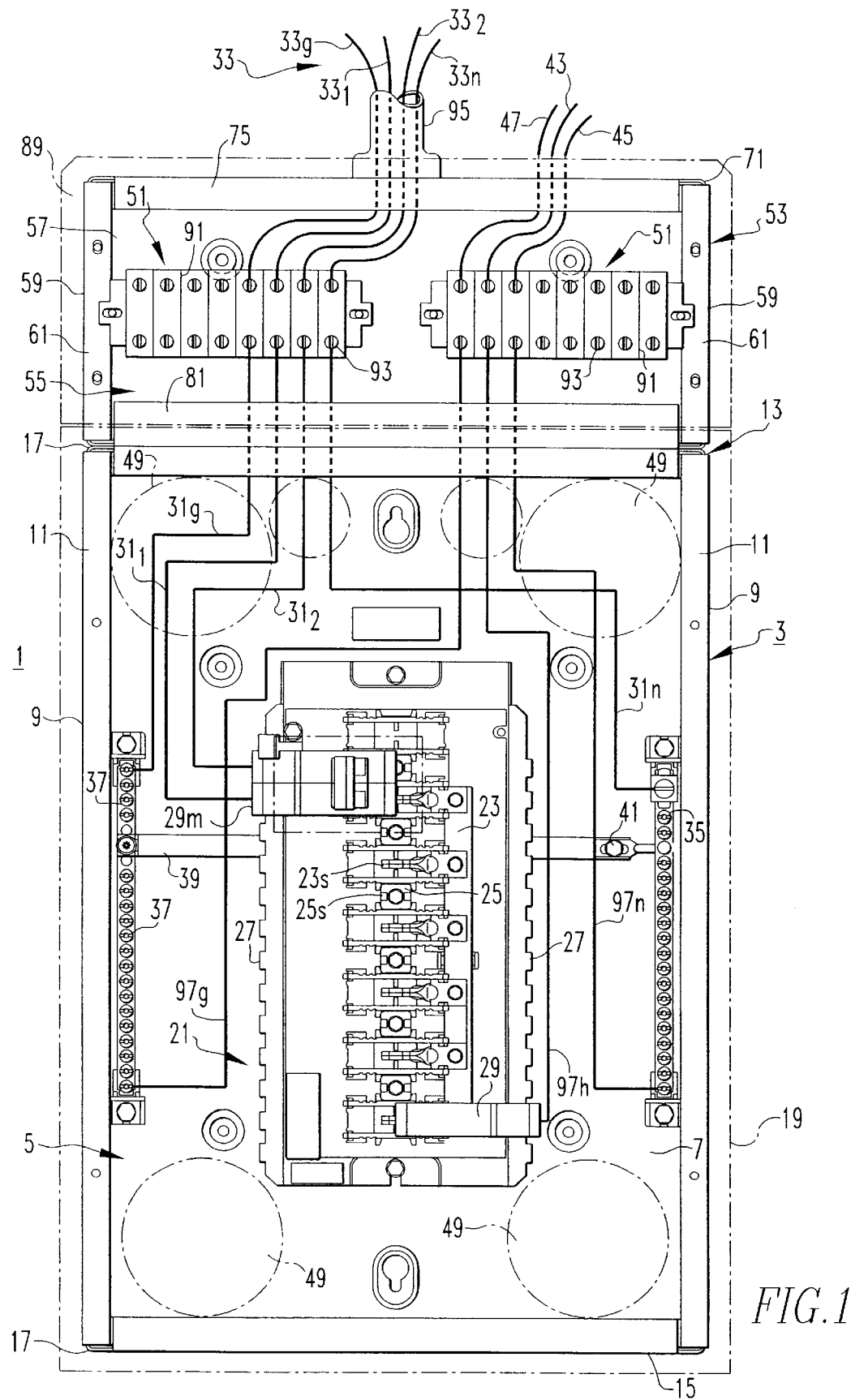
FIG. 1 is a front elevation view with the covers removed of a renovation load center in accordance with the first embodiment of the invention which includes a main enclosure and an auxiliary enclosure.
Figure 4:
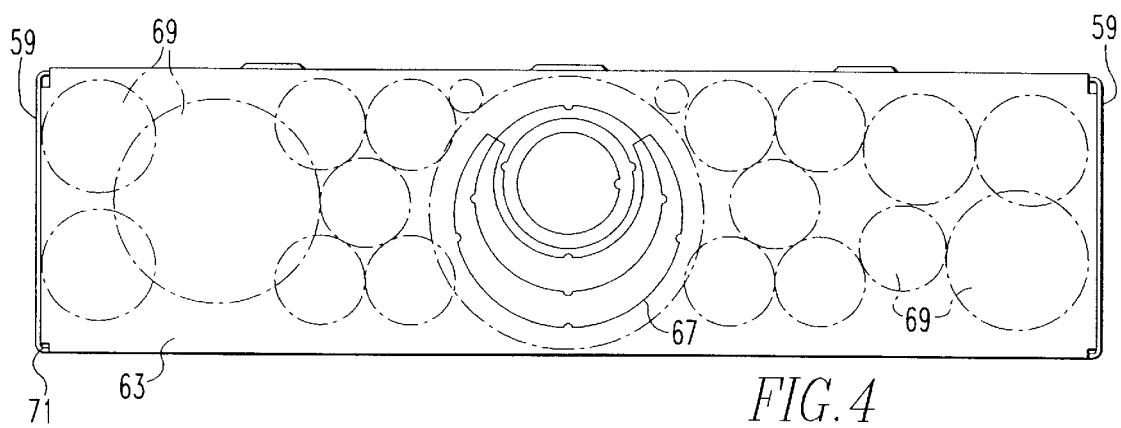
FIG. 4 is a top view of the auxiliary enclosure.
Figure 2:
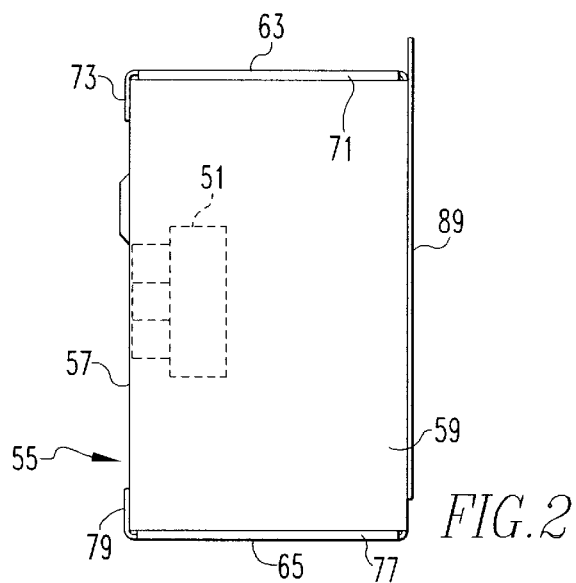
FIG. 2 is a side elevation view of the auxiliary enclosure which forms part of the renovation load center of FIG. 1.

As mentioned, the renovation load center of the invention can be used as a replacement for an existing load center. Circumstances where the invention might be used include, but are not limited to, installations where an old fused load center is being replaced by a load center with circuit breakers, or an installation where an existing load center with circuit breakers is being upgraded with or without the provision for additional branch circuits. It is common, for the incoming supply lines, and in some instances the branch circuit conductors also, to be too short to extend to the terminations in a replacement load center. Typically, the incoming supply lines are of such a gauge that it is difficult to splice extensions onto these lines. While the branch conductors are commonly not of such heavy gauge, it is still also inconvenient, time-consuming and costly to splice extensions on these conductors.

FIGS. 1–4 illustrate a first embodiment of a renovation load center in accordance with the invention that addresses these problems. The renovation load center 1 includes a main enclosure 3 fabricated from sheet metal. This main enclosure 3 includes a center section 5 forming a rear wall 7 with integral sidewalls 9 terminating in inwardly directed, forwardly facing side flanges 11. The main enclosure 3 further include a sheet metal top wall 13 and bottom wall 15 which are both identical to the top wall 63 described in connection with the auxiliary enclosure 53 to be described. These top and bottom walls 13 and 15 have flanges 17 by which they are secured to the center section for instance by welding or a mechanical crimping process such as the TOX LOCK™ process. Finally, the main enclosure 3 includes a cover 19 which has been removed to show the interior of the main enclosure, but is shown in phantom. As is well known, the cover typically includes the hinged door (not shown) for access to the interior.

The main enclosure 3 contains a branch circuit assembly 21 commonly referred to as the interior of the load center, which is secured to the rear wall 7 and includes two line buses 23 and 25 extending vertically and forming alternate, vertically aligned stabs 23s and 25s which can be engaged by line side conductors of circuit breakers. The branch circuit assembly 21 also includes notched, vertically extending circuit breaker mounting flanges 27. Such branch circuit assemblies or interiors 21 are well known and will not be further described in detail. Miniature circuit breakers 29 engage the mounting flange 27 on one side of the assembly and one of the stabs 23s or 25s. Two miniature circuit breakers 29 can be mounted in confronting relation to stabs of the same bus 23 or 25 and to opposite mounting flanges 27. In the arrangement shown, a two pole circuit breaker 29m engages adjacent stabs 23s and 25s. This breaker 29m is back fed through the cables $31_1$ and $31_2$ to energize the buses 23 and 25 and serves as a main circuit breaker for the load center.

Incoming lines or conductors 33 from a supply include lines $33_1$ and $33_2$, neutral lead $33_n$ and, in some cases, ground lead $33_g$. The main enclosure 3 also includes a neutral terminal strip 35 and can contain a ground terminal strip 37. In the installation shown, the neutral terminal strip 35 is grounded at the load center by a strap 39 which is connected to both the neutral terminal strip 35 and the ground terminal strip 37 and is also connected to the metal enclosure at the rear wall 7 by the fastener 41. Each of the circuit breakers 29 is connected to a hot lead 43 which extends out of the enclosure to a branch circuit serving one or more loads (not shown). A corresponding neutral lead 45 from each of the branch circuits is returned to the neutral terminal strip 35. If required a ground lead 47 can be provided from the ground terminal strip 37 for each branch circuit. The neutral terminal strip and the ground terminal strip are connected to supply leads 33n and 33g, respectively. These connections will be explained in detail later.

As shown in FIG. 1 all of the input conductors and branch conductors penetrate the main enclosure through the top wall 13. As mentioned, this top wall 13 is identical to the top wall 63 shown in FIG. 4. The appropriate knockouts are used for the particular installation. Thus, the installation shown is top fed. As is well known, in some installations the load center can be bottom fed. Thus, the appropriate knockouts in the bottom wall are used for penetration of the conductors. Alternatively, the load center can be fed through the back wall at the top or bottom as shown by the various knockouts 49 in the rear wall 7.

As described to this point, the main enclosure 3 with its branch circuit assembly 21 and neutral and ground terminal strips 35 and 37 is identical to a type of load center currently provided for use in new installations. In such new installations, the incoming conductors 33, the hot leads 43, neutral leads 45 and ground leads 47 are all long enough to be connected directly to the branch circuit assembly 21 the circuit breakers 29 the neutral terminal strip 35 and the ground terminal strip 37. However, when such a load center is provided in a renovation, these leads are often not long enough to reach their connections within in the enclosure 3. Therefore, in accordance with the invention, one or more terminal blocks 51 are provided at a point where they can be reached by the existing wiring including the incoming lines 33, the hot leads 43, neutral leads 45 and the ground leads 47. In the embodiment shown in FIG. 1, these terminal blocks 51 are provided in an auxiliary enclosure 53 which is mounted adjacent to the main enclosure 3. In the exemplary installation, the auxiliary enclosure 53 is mounted on top of the main enclosure 3.

As can be seen from FIGS. 1–4, the auxiliary enclosure is similar in construction but smaller than, the main enclosure. Thus, the auxiliary enclosure has a sheet metal center section 55, forming a rear wall 57, pair of integral sidewalls 59 terminating in forward facing, inwardly directed side flanges 61. The auxiliary enclosure has a top wall 63 shown in plain view in FIG. 4 and bottom wall 65 shown in FIG. 3. The top wall 63 has a center knockout 67 for conduit carrying the incoming lines 33 of varying sizes and a number of other knockouts 69 any one or more of which can be removed for accommodating the branch conductors 43, 45, and 47. As can be seen from FIGS. 1, 2 and 4, top wall has side flanges 71 which are secured to the side walls 59 and a rear flange 73 which is secured to a rear wall 57 of the center section 55. A front flange 75 extends between the side flanges 61.

Figure 3:
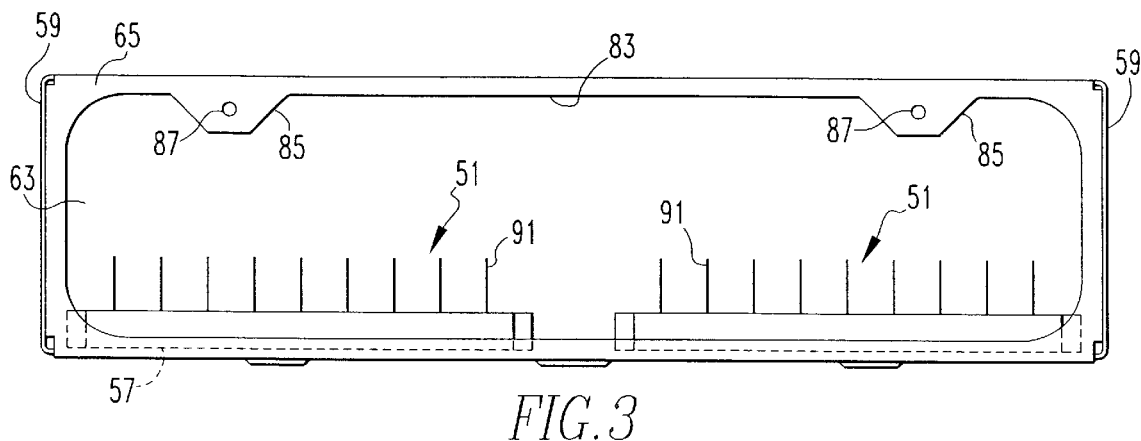
FIG. 3 is a bottom view of the auxiliary enclosure.

The bottom wall 65 of the auxiliary enclosure 53, which is shown in bottom plan view in FIG. 3, has side flanges 77 which are secured to the side walls 59 of the center section 55 and a rear flange 79 which is secured to the rear wall 57. A front flange 81 extends upward along the front edge of the bottom wall 65 between the side flanges 61. The bottom wall 65, as shown in the bottom plan view of FIG. 3, has a large opening 83. A pair of tabs 85 extending into the opening have apertures 87 through which fasteners (not shown) secure the auxiliary enclosure to the top of main enclosure 3. In this manner the auxiliary enclosure 53 can easily be added in the field as needed. The auxiliary 53 also has a cover 89 shown in place in FIG. 2 but shown removed in FIG. 1 but in phantom line.

In the embodiment of FIGS. 1–4, the terminal blocks 51 are secured to the rear wall 57 of the auxiliary enclosure 53. The terminal blocks 51 are of a type having insulating barriers 91 between the terminations 93 so that conductors of differing potentials can be terminated adjacent one another without the danger of arcing. As the incoming lines 33 protected by a conduit 95 are not long enough to reach their terminations within the main enclosure 3, they are connected to terminations 93 on one of the terminal blocks 51. Cables $31_1$ and $31_2$ are connected to the appropriate termination 93 and then fed through the opening 83 in the bottom wall 65 of the auxiliary enclosure 53, through a knockout (not shown) in the top wall of the main enclosure 3 and then to the appropriate termination on the main circuit breaker 29m. In addition, cables 31n and 31g extend from one of the terminal blocks 51 to the neutral terminal strip 35 and ground terminal strip 37, respectively. If any of the hot leads 43, neutral leads 45 or ground leads 47 are too short to reach the associated circuit breaker, termination on a neutral terminal strip 35 or ground terminal strip 37, respectively, they can be connected to a termination 93 on one of the terminal blocks 51 and a cable 97h, 97n or 97g can be connected between that termination and the appropriate termination in the main enclosure 3.

If the main enclosure is bottom fed, the auxiliary enclosure 53 can be mounted to bottom of the main enclosure 3.

Figure 5:
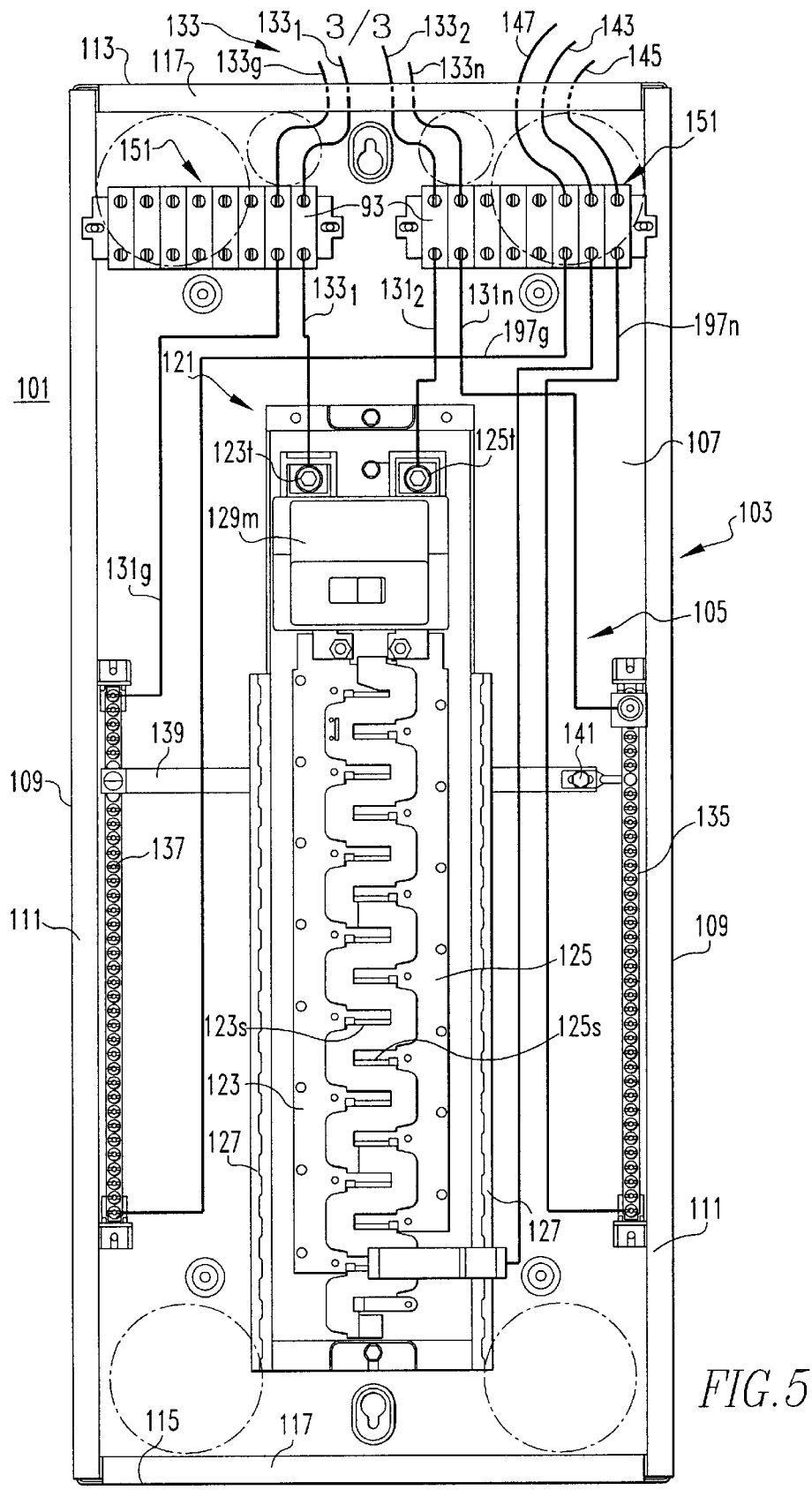
FIG. 5 is a front elevation view of another embodiment of the renovation load center in accordance with the invention.

FIG. 5 illustrates another embodiment of a renovation load center in accordance with the invention. This renovation load center 101 has a single enclosure 103 also fabricated from sheet metal. The center section 105 has a rear wall 107, side walls 109 and front facing side flanges 111. The enclosure 103 also has a top wall 113 and bottom wall 115 secured to the center section 105 in a manner similar to that described above in connection with the embodiment of FIGS. 1–4 and each having a front flange 117. A cover (not shown) is secured to the flanges 111 and 117 and has a hinged door for access to the interior of the enclosure as is well known.

The branch circuit assembly 121, also known as the interior, has a first line bus 123 with stabs 123s and a second line bus 125 with stabs 125s alternating with the stabs of 123s. Notched circuit breaker mounting flanges 127 extend vertically along each side of the branch circuit assembly 121. A two pole main circuit breaker 129m has one pole connected between the first line bus 123 and a first line bus terminal 123t. Similarly, the second pole of the main circuit breaker 129m is connected between the second line bus 125 and a second line bus terminal 125t. A plurality of miniature circuit breakers 129 engage half of one of the stabs 123s or 125s and one of the circuit breaker mounting flanges 127.

The main enclosure 103 also includes a neutral terminal strip 135 and ground terminal strip 137. The neutral terminal strip 135 is grounded at the load center by a strap 139 which is connected to both the neutral terminal strip 135 and the ground terminal strip 137 and is secured to the metal enclosure at the rear wall 107 by the fastener 141.

The incoming lines 133 include lines 133k and 133 $\ell$, neutral 133n and in some cases ground 133g. For each branch circuit served by one of the circuit breakers 129 there is a hot lead 143, a neutral lead 145 and a ground lead 147. As any or all of these external conductors may not be long enough to extend to their connections within the enclosure 103, one or more terminal blocks 151 are provided adjacent the point of penetration of the enclosure 103 by these external lines. Thus in the embodiment shown where the incoming lines and the branch circuit lines are all fed through the top of the enclosure 103, a pair of renovation terminal blocks 151, are provided on the back wall 107 adjacent the top of the enclosure 103. A cable 1311 connects the incoming line 133k through a termination 93 on one of the renovation terminal blocks 151 to the terminal 123t for the first line bus 123 of the branch circuit assembly 121. Similarly, a cable 1312 connects the incoming line 133 $\ell$ to the second line bus terminal 125t, while cable 13 1n connects the line 133n to the neutral terminal strip 135 and the lead 131g connects the ground conductor 133g to the ground terminal strip 137, all through terminations 93 on one of the terminal blocks 151. Also, if the branch circuit conductors 143, 145 or 147 are not long enough to reach the circuit breaker 129, or the appropriate terminal strip 135, 137, then conductors 197h, 197n and 197g. respectively, can connect these branch circuit conductors to the appropriate terminations through a termination 93 on one of the renovation terminal blocks 151.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A renovation load center for a distribution system having incoming lines and a plurality of branch conductors each including at least one hot conductor and at least one neutral conductor, the renovation load center comprising:

an enclosure;

a branch circuit assembly mounted in the enclosure;

a renovation terminal block mounted adjacent one end of the branch circuit assembly and having:
line terminations at least for the incoming lines; and
additional terminations for at least one hot conductor and at least one neutral conductor;

cables engaging the line terminations and connecting the incoming lines to the branch circuit assembly adjacent the one end of the branch circuit assembly;

the branch circuit assembly further having:
a circuit breaker mounting assembly having bus members to which the incoming lines are connected by the cables at one end of the bus members and at least one neutral/ground terminal block;
at least one circuit breaker and a neutral terminal block; and the cables include additional cables connecting the at least one hot conductor through an additional termination to the at least one circuit breaker and connecting the at least one neutral conductor through another additional termination to the neutral terminal block.

2. A renovation load center for a distribution system having incoming lines and a plurality of branch conductors each including at least one hot conductor and at least one neutral conductor, the renovation load center comprising:

an enclosure;

a branch circuit assembly mounted in the enclosure;

a renovation terminal block mounted adjacent the branch circuit assembly and having line terminations at least for the incoming lines; and cables engaging the line terminations and connecting the incoming lines to the branch circuit assembly;

the enclosure includes a main enclosure in which the branch circuit assembly is mounted and an auxiliary enclosure in which the renovation terminal block is mounted; and the cables extending from the renovation terminal block in the auxiliary enclosure to the branch circuit assembly in the main enclosure.

3. The renovation load center of claim 2 wherein at least the main enclosure has knockouts through which the cables extend.

4. The renovation load center of claim 3 wherein the auxiliary enclosure is mounted on the main enclosure.

5. The renovation load center of claim 3 wherein the branch circuit assembly comprises a circuit breaker mounting assembly and at least one neutral terminal block.

6. The renovation load center of claim 5 including an additional neutral terminal block in the auxiliary enclosure.

7. A method of upgrading an existing load center in a distribution system having incoming lines and branch circuits each including a hot conductor and a neutral conductor with a renovation load center, the method comprising:

disconnecting the incoming lines and branch circuits from the existing load center;

removing the existing load center;

mounting the renovation load center in place of the existing load center;

providing a renovation terminal block in an enclosure of the renovation load center;

connecting the incoming lines to terminations on the renovation terminal block;

connecting cables from the terminals on the renovation terminal block to a branch circuit assembly of the renovation load center; and connecting branch circuit hot conductors and neutral conductors in the renovation load center.

8. The method of claim 7 wherein the renovation load center has a main enclosure housing the branch circuit assembly and providing the renovation terminal block includes providing an auxiliary enclosure housing the renovation terminal block adjacent to the main enclosure, and connecting the cables includes routing the cables from the auxiliary enclosure to the main enclosure.

9. The method of claim 8 wherein the branch circuit assembly includes a neutral/ground terminal block and providing the auxiliary enclosure includes providing an additional neutral/ground terminal block in the auxiliary enclosure.

10. The method of claim 7 wherein the renovation load center has a main enclosure housing the branch circuit assembly and at least one neutral/ground terminal block, and providing the renovation terminal block includes providing an additional neutral/ground terminal block adjacent the renovation terminal block.

* * * * *